United States Patent
Nakasu et al.

(10) Patent No.: US 10,586,115 B2
(45) Date of Patent: Mar. 10, 2020

(54) INFORMATION PROCESSING DEVICE, INFORMATION PROCESSING METHOD, AND COMPUTER PROGRAM PRODUCT

(71) Applicant: Kabushiki Kaisha Toshiba, Minato-ku (JP)

(72) Inventors: Toshiaki Nakasu, Chofu (JP); Tomoyuki Shibata, Kawasaki (JP); Kazushige Ouchi, Saitama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 95 days.

(21) Appl. No.: 15/665,662

(22) Filed: Aug. 1, 2017

(65) Prior Publication Data

US 2018/0197018 A1    Jul. 12, 2018

(30) Foreign Application Priority Data

Jan. 11, 2017   (JP) .................................. 2017-002719

(51) Int. Cl.
  *H04N 7/18*   (2006.01)
  *G06K 9/00*   (2006.01)
  *G06T 7/20*   (2017.01)

(52) U.S. Cl.
  CPC ..... *G06K 9/00778* (2013.01); *G06K 9/00221* (2013.01); *G06K 9/00342* (2013.01); *G06K 9/00771* (2013.01); *G06T 7/20* (2013.01)

(58) Field of Classification Search
  CPC ................................................. G06K 9/00778
  USPC ........................................................ 348/169
  See application file for complete search history.

(56) References Cited

U.S. PATENT DOCUMENTS

| 9,563,822 | B2 | 2/2017 | Pham |
| 9,619,729 | B2 | 4/2017 | Pham |
| 2003/0002712 | A1* | 1/2003 | Steenburgh ........ G06K 9/00778 382/103 |
| 2009/0019472 | A1* | 1/2009 | Cleland .................. G06Q 30/02 725/34 |

(Continued)

FOREIGN PATENT DOCUMENTS

| JP | 2011-60026 A | 3/2011 |
| JP | 2011-233119 | 11/2011 |

(Continued)

OTHER PUBLICATIONS

Viet-Quoc Pham et al., "COUNT FOREST: Co-voting Uncertain Number of Targets using Random Forest for Crowd Density Estimation," International Conference on Computer Vision, 2015, pp. 3253-3261.

(Continued)

*Primary Examiner* — Leron Beck
(74) *Attorney, Agent, or Firm* — Oblon, McClelland, Maier & Neustadt, L.L.P.

(57) ABSTRACT

According to an embodiment, an information processing device includes a memory and processing circuitry. The processing circuitry is configured to acquire a captured image; detect a plurality of targets included in the captured image; calculate target information representing at least one of a state or an attribute and reliability of the target information for each of the plurality of detected targets on the basis of the captured image; and estimate a distribution of the target information of the plurality of targets on the basis of a distribution of the target information of targets for which the reliability is higher than a set value.

18 Claims, 13 Drawing Sheets

(56) References Cited

U.S. PATENT DOCUMENTS

| | | | |
|---|---|---|---|
| 2009/0158309 A1 | 6/2009 | Moon et al. | |
| 2010/0313214 A1 | 12/2010 | Moriya et al. | |
| 2010/0322516 A1* | 12/2010 | Xu | G06K 9/00778 382/173 |
| 2011/0176000 A1* | 7/2011 | Budge | G06K 9/00771 348/143 |
| 2013/0182114 A1* | 7/2013 | Zhang | H04N 7/18 348/150 |
| 2014/0226855 A1* | 8/2014 | Savvides | G06K 9/00771 382/103 |
| 2014/0300746 A1* | 10/2014 | Adachi | G06K 9/00771 348/159 |
| 2014/0334718 A1* | 11/2014 | Yamada | G06K 9/00362 382/159 |
| 2014/0348382 A1* | 11/2014 | Sasatani | G06K 9/00369 382/103 |
| 2015/0199698 A1* | 7/2015 | Yoshitake | G06Q 30/0205 705/7.34 |
| 2015/0294183 A1* | 10/2015 | Watanabe | G06K 9/00771 382/203 |
| 2016/0247272 A1 | 8/2016 | Nishino et al. | |
| 2016/0309096 A1* | 10/2016 | Hagisu | G06K 9/00342 |
| 2018/0039860 A1 | 2/2018 | Nakasu et al. | |
| 2018/0157902 A1* | 6/2018 | Tu | G06K 9/00335 |

FOREIGN PATENT DOCUMENTS

| | | |
|---|---|---|
| JP | 2015-158712 | 9/2015 |
| JP | 2016-095640 | 5/2016 |
| JP | 2017-41869 A | 2/2017 |
| JP | 2018-22343 A | 2/2018 |

OTHER PUBLICATIONS

Luca Fiaschi, et al., "Learning to Count with Regression Forest and Structured Labels," Proceedings of International Conference on Pattern Recognition, 2012, pp. 2685-2688.

* cited by examiner

FIG.6

| | STATE | | | | ATTRIBUTE | |
|---|---|---|---|---|---|---|
| | ORIENTATION | MOVING SPEED | FACIAL EXPRES- SION | BEHAVIOR | AGE RANGE | SEX |
| PERSON A | ADVERTISE- MENT (70%) | STATION- ARY (70%) | SMILE (60%) | OPERATING (30%) | 20 TO 39 (70%) | MALE (70%) |
| PERSON B | OTHER THAN ADVERTISE- MENT (60%) | FAST (70%) | NORMAL (60%) | NOT OPERATING (50%) | 40 TO 59 (50%) | MALE (70%) |
| PERSON C | ADVERTISE- MENT (40%) | SLOW (70%) | DISLIKE (40%) | OPERATING (60%) | 60 OR ABOVE (40%) | FEMALE (70%) |
| ⋮ | ⋮ | ⋮ | ⋮ | ⋮ | ⋮ | ⋮ |

INFORMATION PROCESSING DEVICE, INFORMATION PROCESSING METHOD, AND COMPUTER PROGRAM PRODUCT

CROSS-REFERENCE TO RELATED APPLICATIONS

This application is based upon and claims the benefit of priority from Japanese Patent Application No. 2017-002719, filed on Jan. 11, 2017; the entire contents of which are incorporated herein by reference.

FIELD

Embodiments described herein relate generally to an information processing device, an information processing method, and a computer program product.

BACKGROUND

A monitoring camera system that monitors persons who pass through a passage of as station or the like or stay at a floor of a building or the like is known. In each a monitoring camera system, persons are imaged from an imaging device attached to a ceiling or other places.

In a monitoring camera system, it is also desired not only to display a captured image but also to discriminate a state and other information of a person. For example, in a monitoring camera system, it is desired to discriminate whether a person is looking at an advertisement. By discriminating whether a person is looking at the advertisement, the monitoring camera system car calculate the number and other information of persons who have looked at the advertisement.

However, the imaging device used for the monitoring camera system is fixed. Therefore, a person at a position far from the imaging device becomes relatively small in the image. There are also cases where a person of which recognition rate decreases due to an influence of light, shadow or the like is included in an image. For this reason, it is difficult for a monitoring camera system to accurately discriminate a state and other information for every person included in an image.

BRIEF DESCRIPTION OF THE DRAWINGS

FIG. 6 is a diagram illustrating a plurality of types of exemplary states or attributes;

DETAILED DESCRIPTION

According to an embodiment, an information processing device includes a memory and processing circuitry. The processing circuitry is configured to acquire a captured image; detect a plurality of targets included in the captured image; calculate target information representing at least one of a state or an attribute and reliability of the target information for each of the plurality of detected targets on the basis of the captured image; and estimate a distribution of the target information of the plurality of targets on the basis of a distribution of the target information of targets for which the reliability is higher than a set value.

Hereinafter, a detection system 10 according to the present embodiment will be described with reference to the drawings. Note that, in the following embodiments, parts denoted by the same reference symbol have substantially the same configuration and operation, and thus overlapping descriptions will be omitted as appropriate except for differences.

First Embodiment

Figure 1:
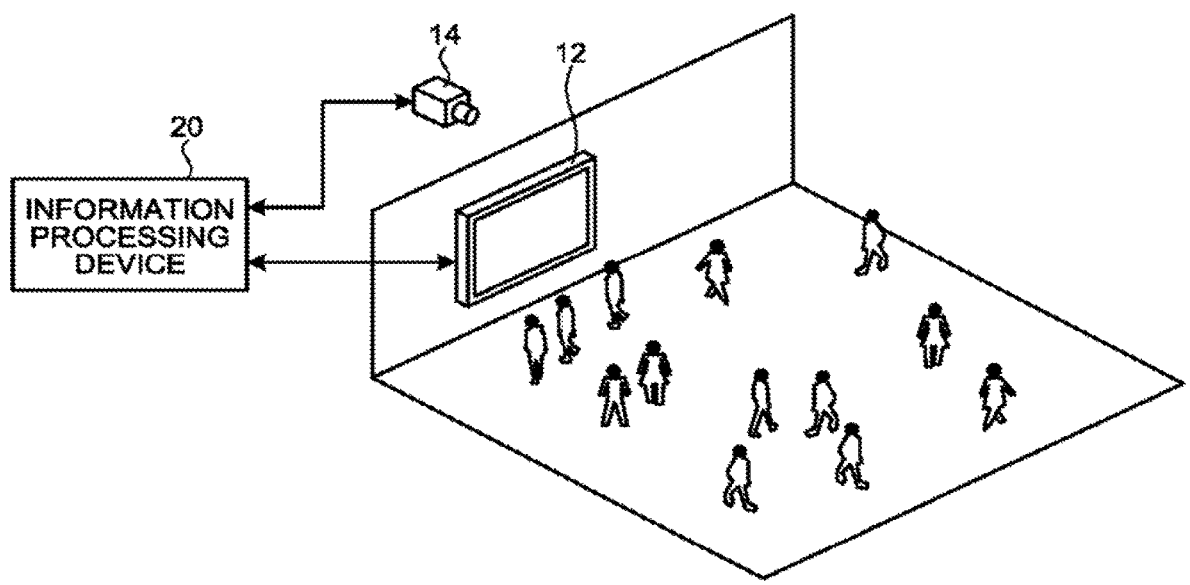
FIG. 1 is a diagram illustrating a detection system according to a first embodiment.

FIG. 1 is a diagram illustrating a detection system 10 according to a first embodiment. The detection system 10 accurately estimates a distribution of target information representing at least one of a state or an attribute of a plurality of targets present in a first space on the basis of a captured image obtained by imaging the first space. For example, the detection system 10 accurately calculates the number of targets present in the first space and in a predetermined state or having a predetermined attribute on the basis of the captured image obtained by imaging the first space. Alternatively, for example the detection system 10 accurately calculates the number of targets present in the first space and in a predetermined state and having a predetermined attribute on the basis of the captured image obtained by imaging the first space.

For example, a target is a person. The first space is a place where a target passes or stays. For example, in a case where a target is a person, the first space is a passage or a platform of a station, a road, a floor of a building, or the like. Note that a target is not limited to a person, but may be another body such as a vehicle.

A state is a feature of a target recognizable from an image which may change depending on time or environment. For example, when a target is a person, a state is face orientation, body orientation, a moving speed, a moving method, a facial expression (e.g. laugh, sadness, anger, dislike, astonishment or fear), a behavior, or the like.

If a state is face orientation, a distribution of the state is information such that 20% of a plurality of targets are oriented rightward while 80% of the plurality of targets are oriented leftward. Also, a predetermined state is one specified state among various states. For example, a predetermined state is a state in which the target is looking at a predetermined object (e.g. advertisement), a state in which the target is oriented toward a predetermined direction (e.g. southwest direction), a state in which the target is moving at a predetermined speed range (e.g. range from, a speed per hour of 5 km/h to a speed per hour of 10 km/h), or other states. Furthermore, for example, a predetermined, state is a state in which the target, is showing a predetermined facial expression (e.g. smile), or a predetermined behavior (e.g. state in which the target is operating a mobile terminal device), or other states.

An attribute is a feature of a target recognizable from an image that does not change with time or environment. For example, when a target is a person, an attribute is sex, age, an age range, or the like.

If the attribute is sex, a distribution of the attribute is information such that 20% of a plurality of targets are males while 80% of the plurality of targets are females. A predetermined attribute may be male, female, a predetermined age (e.g. 30 years old), a predetermined age range (e.g. 20 to 39 years old), or the like.

The detection system 10 includes a display device 12, an imaging device 14, and an information processing device 20.

The display device 12 displays information. For example, the display device 12 displays an advertisement as information. The display device 12 may display news, various notification information or the like without being limited to an advertisement. The display device 12 is arranged in a fixed manner at a position where information can be presented to a person present in the first space.

The display device 12 may display a moving image, a still image, or only characters. In the present embodiment, contents of information to be displayed by the display device 12 are controlled by the information processing device 20. However, the display device 12 may be an independent device not connected to the information processing device 20, or may be a signboard to which paper or the like is attached.

The imaging device 14 is arranged in a fixed manner at a position where a plurality of targets present in the first space can be imaged. The imaging device 14 images the first space from the fixed position. The imaging device 14 images the first space at predetermined time intervals and provides the plurality of captured Images obtained by the imaging to the information processing device 20.

The information processing device 20 is, for example, a dedicated or a general purpose computer. The information processing device 20 may be a PC or a computer Included in a server that stores and manages information. The information processing device 20 may be implemented by a single device or may be implemented by a plurality of devices operating in cooperation. The information processing device 20 may be a virtual device (e.g. cloud) implemented on a network or the like.

The information processing device 20 controls the display device 12 to display predetermined information (e.g. advertisement) on the display device 12. The information processing device 20 controls the imaging device 14 to acquire the captured image captured by the imaging device 14.

Then, on the basis of the captured image captured by the imaging device 14, the information processing device 20 estimates a distribution of target information representing at least one of a state or an attribute of the plurality of targets present in the first space. For example, the information processing device 20 calculates the number of targets present in the first space and in a predetermined state or having a predetermined attribute on the basis of the captured image captured by the imaging device 14. For example, the information processing device 20 calculates the number of targets present in the first space and in a predetermined state and having a predetermined attribute on the basis of the captured image captured by the imaging device 14. Furthermore, for example, when a target is a person and the display device 12 displays an advertisement, the information processing device 20 calculates the number of targets looking at the advertisement on the basis of the captured image captured by the imaging device 14.

Figure 2:
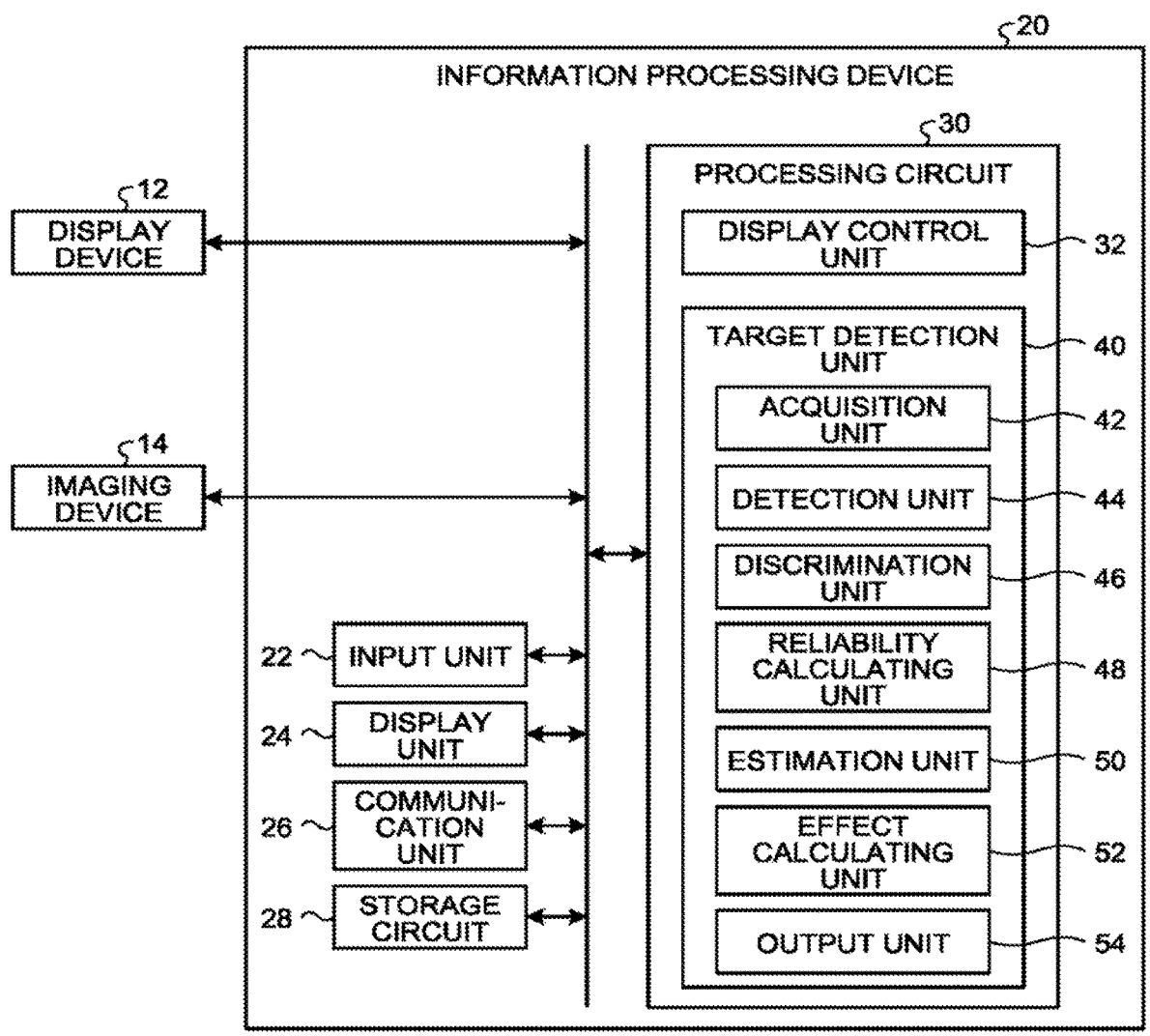
FIG. 2 is a diagram illustrating a configuration of an information processing device together with a display device and an imaging device.

FIG. 2 is a diagram illustrating a configuration of the information processing device 20 together with the display device 12 and the imaging device 14.

The information processing device 20 includes an input unit 22, a display unit 24, a communication unit 26, a storage circuit 28, and a processing circuit 30. The input unit 22, the display unit 24, the communication unit 26, the storage circuit 28, and the processing circuit 30 are connected via a bus. The information, processing device 20 is further connected to the display device 12 and the imaging device 14, for example, via a bus.

The input, unit 22 accepts various instructions and information input operations from a user. The input unit 22 is, for example, a pointing device such as a mouse or a track ball, or an input device such as a keyboard.

The display unit 24 displays various types of information such as image data. The display unit 24 is, for example, a display device such as a liquid crystal display.

The communication unit 26 is an interface for performing input/output of information to/from an external device connected thereto by wire or wirelessly. The communication unit 26 may perform communicate by being connected to a network.

For example, the storage circuit 28 is a random access memory (RAM), a semiconductor memory element such as a flash memory, a hard disk, an optical disk, or the like. Furthermore, processing performed by the storage circuit 28 may be replaced by a storage device external to the information processing device 20. The storage circuit 28 may be a storage medium that downloads a program transmitted by a local area network (LAN), the Internet, or the like, and stores or temporarily stores the program. Also, the storage medium is not limited to one, and may include a plurality of media.

The processing circuit 30 includes one or more processors. The one or more processors read and execute a program from the storage circuit 28. The processing circuit 30 with the one or more processors reading and executing a program includes the respective units illustrated in the processing circuit 30 in FIG. 2. That is, execution of the program by one or more processors allows the processing circuit 30 to function as a display control unit 32 and a target detection unit 40.

The display control unit 32 controls the display device 12 to display predetermined information (e.g. advertisement) on the display device 12. The target detection unit 40 controls the imaging device 14 to acquire a captured image captured by the imaging device 14. The target detection unit 40 further estimates a distribution of target information representing at least one of a state or an attribute of a plurality of targets present in the first space on the basis of the acquired captured image. For example, the target detection unit 40 calculates the number of targets present in the first space and in a predetermined state or having a predetermined attribute on the basis of the acquired captured image. Alternatively, for example, the target detection unit 40 calculates the number of targets present in the first space and in a predetermined state and having a predetermined attribute on the basis of the acquired captured image. Furthermore, for example, when a target is a person and the display device 12 displays an advertisement, the target detection unit 40 calculates the number of targets looking at the advertisement on the basis of the acquired captured image.

The target detection unit 40 includes an acquisition unit 42, a detection unit 44, a discrimination unit 46, a reliability calculating unit 48, an estimation unit 50, an effect calculating unit 52, and an output unit 54. Details of the respective units will be described later.

The processing circuit 30 may further include a dedicated hardware circuit different from the processors. The dedicated hardware circuit implements a part or all of the function the respective units on behalf of the processors.

The processors may be, for example, a central, processing unit (CPU). The processors are not limited to a CPU but may be a data processing device of another type that executes a program.

The storage circuit 28 stores a program for causing the processing circuit 30 to function as the display control unit 32 and the target detection unit 40 (including the acquisition unit 42, the detection unit 44, the discrimination unit 46, the reliability calculating unit 48, the estimation unit 50, the effect calculating unit 52, and the output unit 54). The storage circuit 28 stores data and the like associated with respective processing functions performed by the processing circuit 30 as necessary.

The storage circuit 23 stores a captured, image captured by the imaging device 14. In addition, the storage circuit 28 stores information representing a processing result and an output image.

Here that, instead of the storage circuit 28 storing the program, a read only memory (ROM) inside the processing circuit 30 may store the program. In this case, reading and executing of the program stored in the internal ROM (incorporated inside) by the one or more processors allow the processing circuit 30 to implement a function corresponding to the program.

Figure 3:
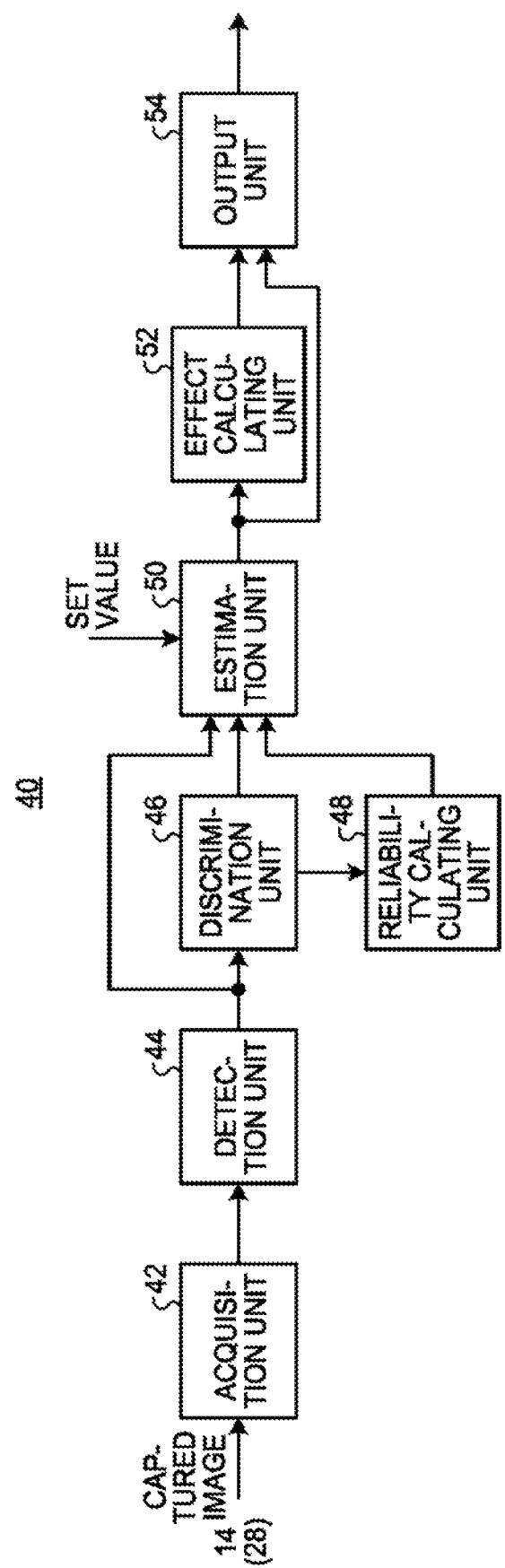
FIG. 3 is a configuration diagram of a target detention unit according to the first embodiment.

FIG. 3 is a diagram illustrating a configuration of the target detection unit 10 according to the first embodiment. The target detection unit 40 includes the acquisition unit 42, the detection unit 44, the discrimination unit 46, the reliability calculating unit 48, the estimation unit 50, the effect calculating unit 52, and the output unit 54.

The acquisition unit 42 acquires a captured image capturing the first space. For example, the acquisition unit 42 acquires a captured image from the imaging device 14. When the storage circuit 28 stores a captures image captured by the imaging device 14, the acquisition unit 42 may acquire the captured image from the storage circuit 28. Alternatively, the acquisition unit 42 may acquire a plurality of captured images captured at predetermined time intervals.

The detection unit 44 detects each of a plurality of targets present in the first space included in the captured image. For example, the detection unit 44 detects the number of the plurality of targets present in the first space and positions of each of the plurality of targets. When acquiring a plurality of captured images captured by the acquisition unit 42 at predetermined time intervals, the detection unit 44 detects each of a plurality of targets present, in the first space and included in each of the plurality of captured images.

For example, when a target is a person, the detection unit 44 may detect the face, the head, the upper body, the whole body or a predetermined body part of a person from the captured image. Alternatively, the detection unit 44 may divide the captured image into a plurality of small areas and calculate density of targets for each of the small areas. The detection unit 44 may regard the number of targets only a half of which is included in the captured image or in the small area as 0.5.

The discrimination unit 46 discriminates, on the basis of the captured image, target information representing at least one of states or attributes of each of the plurality of targets detected by the detection unit 44. For example, the discrimination unit 46 discriminates whether each of the plurality of detected targets is in a predetermined state or having a predetermined attribute. Alternatively, for example, the discrimination unit 46 discriminates whether each of the plurality of detected targets is in a predetermined state and having a predetermined attribute.

For example, it is assumed that each of the plurality of targets is a person and that the predetermined state is a state in which the person is looking at an object installed at a predetermined position. In this case, the discrimination unit 46 discriminates whether each of the plurality of detected targets is looking at the object. The object may be the display device 12 that displays an advertisement. In this case, the discrimination unit 46 may discriminate whether each of the plurality of targets detected by the detection unit 44 is looking at the advertisement.

For example, the discrimination unit 46 may detect an orientation (direction) of the target and discriminate whether the target Is looking at the object (e.g. display device 12) on the basis of the orientation of the detected target. In this case, the discrimination unit 46 may detect an orientation of the face or an orientation of the body as an orientation of the target. The discrimination unit 46 may detect an orientation of a target in units of a predetermined angle (e.g. 1 degree). Alternatively, the discrimination unit 46 may discriminate an orientation of a target with options of whether the target is oriented rightward or leftward in the image, or whether the target is oriented upward or downward in the image.

Furthermore, the discrimination unit 46 may detect the moving speed of a target and discriminate whether the target is looting at an object (e.g. the display device 12) on the basis of the detected moving speed. For example, when the detected moving speed is less than or equal to a predetermined speed, the discrimination unit 46 discriminates that the target is looking at the object. In this case, the detection unit 44 may follow the target for each captured image and detect the moving speed of the target on the basis of a change in the position of the target.

Furthermore, the detection unit 44 may further discriminate whether the target is looking at the object (e.g. display device 12) on the basis of the moving direction of the target. For example, when the detected moving direction coincides with a direction toward the object, the discrimination unit 46 may discriminate that the target is looking at the display device 12.

In addition, when the detection unit 44 calculates density of targets for each of the small areas, the discrimination unit 46 discriminates a distribution of target information representing at least one of states or attributes for each of the small areas. For example, the discrimination unit 46 may discriminate that, for a small area for example, 20% of the targets are looking at the object while 80% of the target are not looking at the object.

For each of the plurality of targets detected by the detection unit 44, the reliability calculating unit 48 calculates reliability of a discrimination result that discriminates target information. For example, the reliability calculating unit 48 calculates the reliability on the basis of resolution, size, brightness, contrast, or the like of a target detected from the captured image.

The reliability calculating unit 48 may calculate reliability normalized to a numerical value between 0% and 100%. Furthermore, when the detection unit 44 calculates density of targets for each of the small areas, the reliability calculating unit 48 calculates reliability for each of the small areas. For example, the discrimination unit 46 may calculate that, for a small area for example, 20% of the targets are looking at the object while 80% of the targets are not looking at the object with a reliability of 80%. Note that reliability may also be calculated in addition to determining a state and an attribute of each of the plurality of targets. In this case, the reliability calculating unit 48 is incorporated in the discrimination unit 46 and thereby implemented, for example.

The estimation unit 50 receives a set value having been input in advance. The set value is a value within a range of values that reliability may take. For example, when the reliability calculating unit 48 calculates reliability normalized to a numerical value between 0% and 100% or less, a set value is a value in the range between 0% and 100%.

The estimation unit 50 identifies one or more targets for which the reliability is higher than the set value from among the plurality of targets detected by the detection unit 44. Subsequently, the estimation unit 50 calculates a distribution of discrimination results of target information representing at least one of states or attributes of the one or more targets for which the reliability is higher than the set value. The estimation unit 50 then estimates a distribution of target information of a plurality of targets present in the first space on the basis of the distribution, of the target information of the targets for which the reliability is higher than the set value. For example, the estimation unit 50 estimates a distribution of the target information of all of the plurality of targets present in the first space.

For example, the estimation unit 50 identifies the number (first number) of one or more targets for which the reliability is higher than the set value from among the plurality of targets detected by the detection unit 44. Subsequently, the estimation unit 50 identifies the number (second number) of targets discriminated to be in a predetermined state or having a predetermined attribute from among the one or more targets for which the reliability is higher than the set value. Subsequently, the estimation unit 50 calculates a ratio (first ratio) of the number of targets (second number) discriminated to be in a predetermined state or having a predetermined attribute to the number (first number) of one or more targets for which the reliability is higher than the set value. Then, the estimation unit 50 may multiply the total number of the plurality of targets detected by the detection unit 44 by the calculated ratio (first ratio) to calculate the number of targets present in the first space and in a predetermined state or having a predetermined attribute.

More specifically, when a target is a person and a predetermined state is a state in which the person is looking at the display device 12 as an object, the estimation unit 50 executes the following processing.

First, the estimation unit 50 identifies the number (total number) of the plurality of targets detected by the detection unit 44. For example, let us assume that the estimation unit 50 has identified 17 persons as the total number.

Subsequently, the estimation unit 50 identifies the number (first number) of one or more targets for which the reliability is higher than the set value from among the plurality of targets detected by the detection unit 44. For example, it is assumed that the estimation unit 50 has identified 11 persons as the first number.

Subsequently, the estimation unit 50 identifies the number (second number) of targets discriminated to be looking at the display device 12 from among the one or more targets for which the reliability is higher than the set value. For example, it is assumed that the estimation unit 50 has identified 5 persons as the second number.

Subsequently, the estimation unit 50 calculates a ratio (first ratio) of the number of targets (second number) discriminated to be looking at the display devise 12 to the number (first number) of the one or more targets for which the reliability is higher than the set value. In this example, the estimation unit 50 calculates 5/11 as the first ratio.

Then, the estimation unit 50 multiplies the total number of the plurality of targets detected by the detection unit 44 by the calculated ratio (first ratio) to calculate the number of targets present in the first space and looking at the display device 12. In this example, the estimation unit 50 calculates $17 \times 5/11 \approx 7.7$ as the number of targets present in the first space and looking at the display device 12.

In this way, when a target is a person and a predetermined state is the state in which the person is looking at the display device 12, the estimation unit 50 can calculate the number of targets looking at the object present in the first space.

When acquiring a plurality of captured images captured at predetermined time intervals by the acquisition unit 42, the estimation unit 50 may estimate time series information representing, in a time series, a distribution of target information representing at least one of states or attributes of the plurality of targets present in the first space. For example, the estimation unit 50 may calculate time series information representing the number of targets present in the first space and looking at an object in a time series.

The estimation unit 50 may further perform averaging processing on the time series information in terms of time or remove outliers that greatly deviate from preceding and subsequent calculation results. As a result of this, the estimation unit 50 can calculate more accurate time series information with influence of noise or the like eliminated. When the detection unit 44 calculates density of target for each small area, the estimation unit 50 may calculate the number or time series information of the targets looking at the display device 12 for each of the small areas.

When a target is a person, the display device 12 displays an advertisement, and the estimation unit 50 has calculated the number of targets looking at the display device 12 as an object, the effect calculating unit 52 calculates an advertising effect that the advertisement has on a plurality of targets.

An advertising effect is, for example, an attention rate, man-seconds of staying or total man-seconds of viewing. An attention rate is the ratio of the number of targets (persons) looking at the advertisement to the total number of targets (persons) present in the first space. Also, man-seconds of staying is time (seconds) per target (person) looking at the advertisement. The total man-seconds of viewing is time (seconds) obtained by accumulating times for which targets (persons) are looking at the advertisement. Furthermore, when the detection unit 44 follows targets for each captured image, the effect calculating unit 52 may identify a target (person) looking at the advertisement for a predetermined time or more and calculate an advertising effect from the identified target (person).

Moreover, the display device 12 may change the advertisement every certain period of time. In such a case, the effect calculating unit 52 may calculate an advertising effect for each advertisement. In addition, the display device 12 may display different images or contexts even for an advertisement related to the same product. In such a case, the effect calculating unit 52 may calculate an advertising effect for each of the Armors or the contexts. Furthermore, for example, there are cases where a target present in the first space cannot physically see the advertisement due to some reason. For example, when an advertisement is displayed opposite to a platform across a railroad track, a target cannot see the advertisement during a time period when a train is stopped at the platform. The effect calculating unit 52 may not calculate an advertising effect for such a time period.

The effect calculating unit 52 may further acquire information such as weather information, temperature information, a time period during which an event has occurred or social situations, a design of the advertisement, or arrangement of the advertisement and add them to the advertising effect. As a result of this, the effect calculating unit 52 can provide a reference for setting of an advertisement fee and prediction of future advertising effect.

The output unit 54 outputs, to the outside, the distribution of the target information of the plurality of targets present in the first space estimated by the estimation unit 50. For example, the output unit 54 outputs, to the outside, the number of targets present in the first space and in a predetermined state or having a predetermined attribute (or the number of targets in a predetermined state and having a predetermined attribute) calculated by the estimation unit 50. Furthermore, when the display device 12 displays an advertisement, the output unit 54 may output, to the outside, the number of targets present in the first space and looking at the advertisement. When the effect calculating unit 52 calculates an advertising effect, the output unit 54 further outputs the advertising effect to the outside.

Note that outputting to the outside means, for example, displaying information of as target on the display unit 24, transmitting the information of the target to another device via the communication unit 26, or storing the information of the target in the storage circuit 28.

Figure 4:
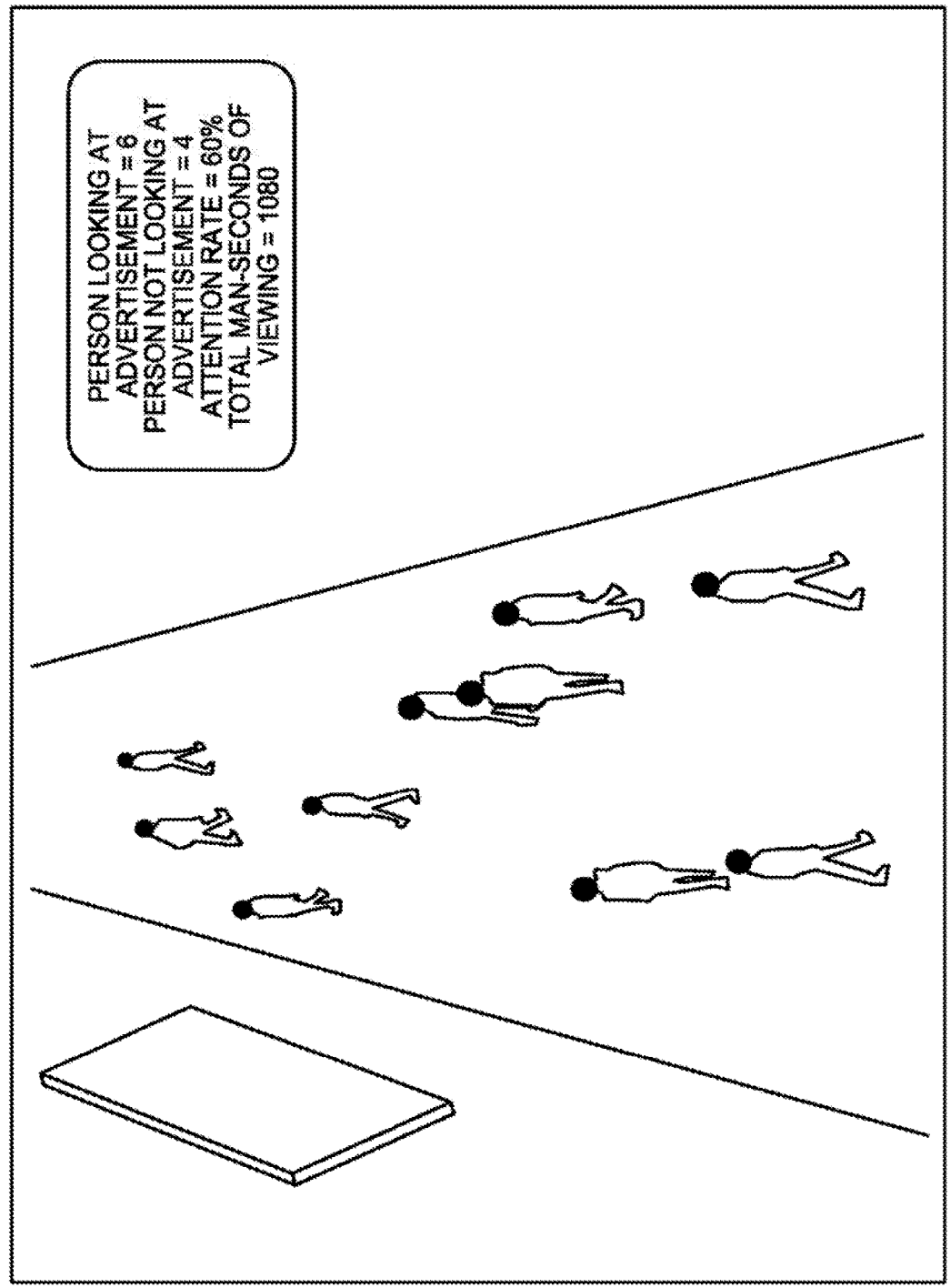
FIG. 4 is a diagram illustrating an exemplary output image according to the first embodiment.

FIG. 4 is a diagram illustrating an exemplary an output image output from the target detection unit 40 according to the first embodiment. For example, when a target is a person and the display device 12 displays an advertisement and the estimation unit 50 calculates the number of targets looking at the display device 12, the output unit 54 may display the number of targets looking at the advertisement on the display unit 24. For example, the output unit 54 may add information indicating the number of targets looking at the advertisement to the output image representing targets present in the first space as illustrated in FIG. 4 thereby display on the display unit 24.

The output, unit 54 may further add the advertising effect calculated by the effect calculating unit 52 to the output image and display them on the display unit 24. In addition, when the time series information is calculated, the output unit 54 may add the time series information and the advertising effect to the output image while dynamically changing the output image in accordance with the movement of the targets.

Note that the output image may be an image captured by the imaging device 14. Furthermore, the output unit 54 may persons coordinate transformation on the position of the target detected from the captured image to generate, for example, a top view image, an isometric view image, and other images of the first space. Then, the output unit 54 may display the generated top view image or the isometric view image on the display unit 24 as an output image.

Figure 5:
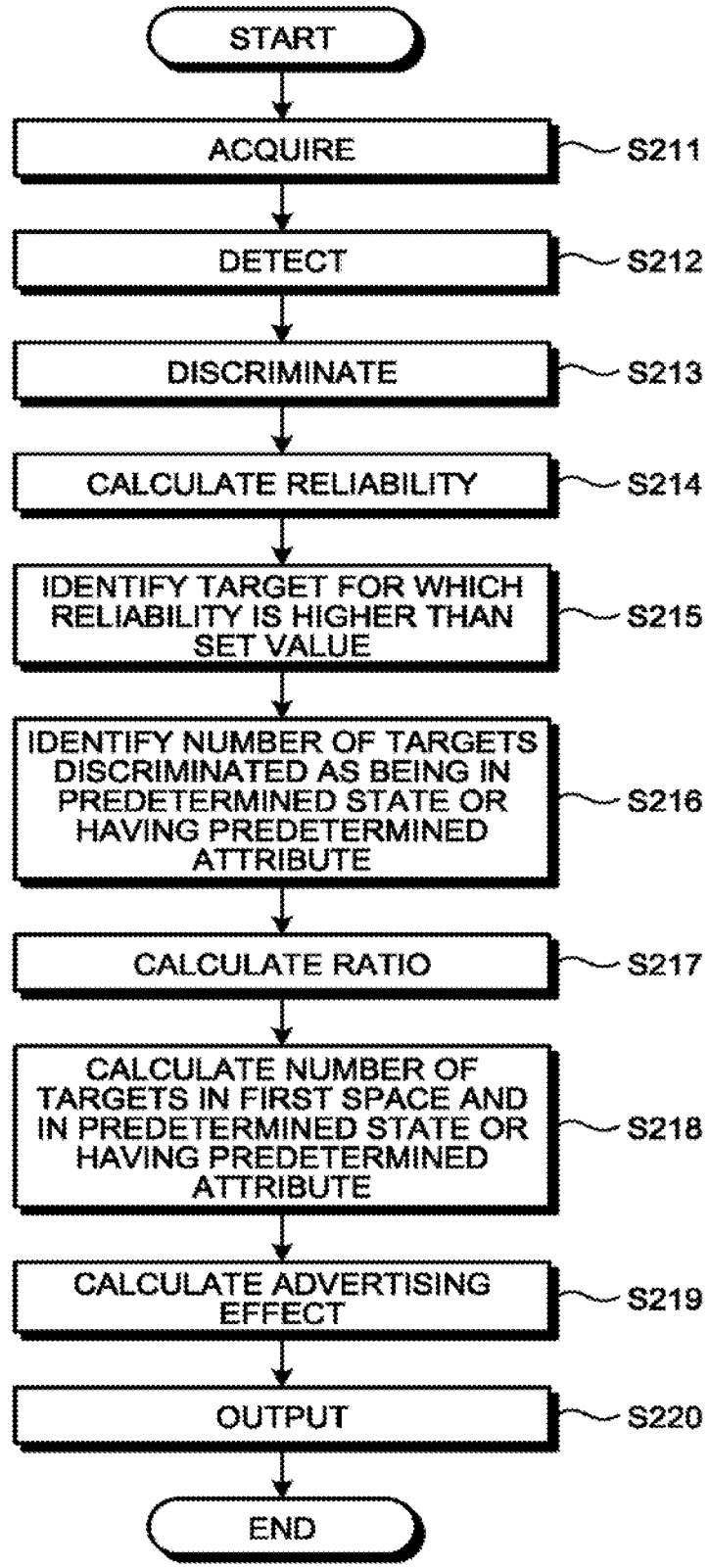
FIG. 5 is a flowchart illustrating processing of the target detection unit according to the first embodiment.

FIG. 5 is a flowchart illustrating processing of the target detection unit 40 according to the first embodiment. The target detection unit 40 executes processing according to the flowchart illustrated in FIG. 5.

First, the acquisition unit 42 acquires a captured image capturing the first space in S211. Subsequently, the detection unit 44 detects each of a plurality of targets present in the first space included in the captured image in S212.

Subsequently, the discrimination unit 46 discriminates target information representing at least one of states or attributes of each of the plurality of detected targets in S213. Here, the discrimination unit 46 discriminates whether each of the plurality of detected targets is in a predetermined state or having a predetermined attribute (or in a predetermined state and having a predetermined attribute).

Subsequently, the reliability calculating unit 48 calculates reliability of the discrimination result discriminating the target information for each of the plurality of detected targets in S214.

Subsequently, the estimation unit 50 identifies the number (first number) of one or more targets for which the reliability is higher than a set value from among the plurality of targets detected in S215. Subsequently, the estimation unit 50 detects the number of targets (second number) discriminated to be in a predetermined state or having a predetermined attribute (or in a predetermined state and having a predetermined attribute) from among one or more targets for which the reliability is higher than the set value in S216.

Subsequently, the estimation unit 50 calculates a ratio (first ratio) of the number of targets (second number) discriminated to be in a predetermined state or having a predetermined attribute (or in a predetermined state and having a predetermined attribute) to the number of one or more targets (first number) for which the reliability is higher than the set value in S217. Then, the estimation unit 50 multiplies the total number of the plurality of targets detected by the detection unit 44 by the calculated ratio (first ratio) to calculate the number of targets present in the first space and in a predetermined state or having a predetermined attribute (or in a predetermined state and having a predetermined attribute) in S218.

When a target is a person, the display device 12 displays an advertisement and the estimation unit 50 has calculated the number of targets looking at the display device 12, the effect calculating unit 52 calculates an advertising effect in S219. Note that, when an advertising effect is not calculated, the effect calculating unit 52 ships the processing of S219.

Subsequently, the output unit 54 outputs, to the outside, the calculated number of targets present in the first space and in a predetermined state or having a predetermined attribute (or in a predetermined state and having a predetermined attribute) in S220. Note that, when an advertising effect is calculated in S219, the output unit 54 further outputs the advertising effect.

The target, detection unit 40 executes the above processing every time the imaging device 14 outputs a captured image (e.g. for every frame). Alternatively, the target detection unit 40 may collectively execute the processing from S211 to S220 on a plurality of captured images.

FIG. 6 is a diagram illustrating a plurality of types of exemplary states or attributes. The discrimination unit 46 may discriminate the plurality of types of states and attributes for each of the plurality of detected targets. For example, when a target is a person, the discrimination unit 46 may discriminate an orientation, a moving speed, a facial expression, and a behavior as the states. Furthermore, the discrimination unit 46 may discriminate an age range and sex as the attributes.

For example, the discrimination unit 46 may discriminate whether a target is oriented toward the advertisement or not. Furthermore, for example, the discrimination unit 46 may discriminate whether a target is stationary, moving at a speed higher than or equal to a first speed and lower than a second speed (slow), or moving at a speed higher than or equal to the second speed (fast). The discrimination unit 46 may further discriminate whether the target, is smiling, normal, or dislikes. Furthermore, the discrimination unit 46 may discriminate whether the target is operating a mobile terminal device or not.

Furthermore, for example, the discrimination unit 46 may discriminate whether the age of the target is 19 years old or younger, 20 to 39 years odd, 40 to 59 years old, or 60 years old or above. Furthermore, for example, the discrimination unit 46 may discriminate whether the target is a male or a female.

As described above, when the plurality of types of states or attributes are discriminated for one target, the reliability calculating unit 48 calculates, for each of the plurality of detected targets, reliability of discrimination results discriminating each of the plurality of types of the states and the attributes. For example, a bracketed description in each box in FIG. 6 represent reliability.

Furthermore, when the plurality of types of states and attributes are discriminated for one target in this manner, the estimation unit 50 estimates a distribution of the plurality of types of the states and the attributes of a plurality of targets present in the first space on the basis of a distribution of the plurality of types of the states and the attributes of targets for which the reliability is higher than the set value.

For example, the estimation unit 50 may calculate the number of targets looking at the display device 12 as an object for each sex. Furthermore, the estimation unit 50 may calculate the number of targets looking at the display device 12 as an object for each age range. This allows the effect calculating unit 52 to calculate an advertising effect in more detail.

If addition, the effect calculating unit 52 may correct the advertising effect using discrimination results of a state and an attribute of a predetermined type. For example, the effect calculating unit 52 may correct the advertising effect on the basis of a distribution of discriminated facial expressions. More specifically, the effect calculating unit 52 may raise the advertising effect if a ratio of smiling persons is high, and lower the advertising effect if the ratio of smiling persons is low. Also, the effect calculating unit 52 may lower the advertising effect if a ratio of persons moving at a fast speed is high, and may raise the advertising effect if the ratio of the persons moving at a fast speed is low.

Furthermore, the effect calculating unit 52 may raise an advertising effect if a ratio of persons showing a specific behavior is high. For example, the effect calculating unit 52 may raise the advertising effect if a ratio of persons acquiring information of the advertisement by operating a mobile terminal device is high or a ratio of persons acquiring information from a 2D code displayed on the advertisement using a mobile terminal device is high.

Figure 7:
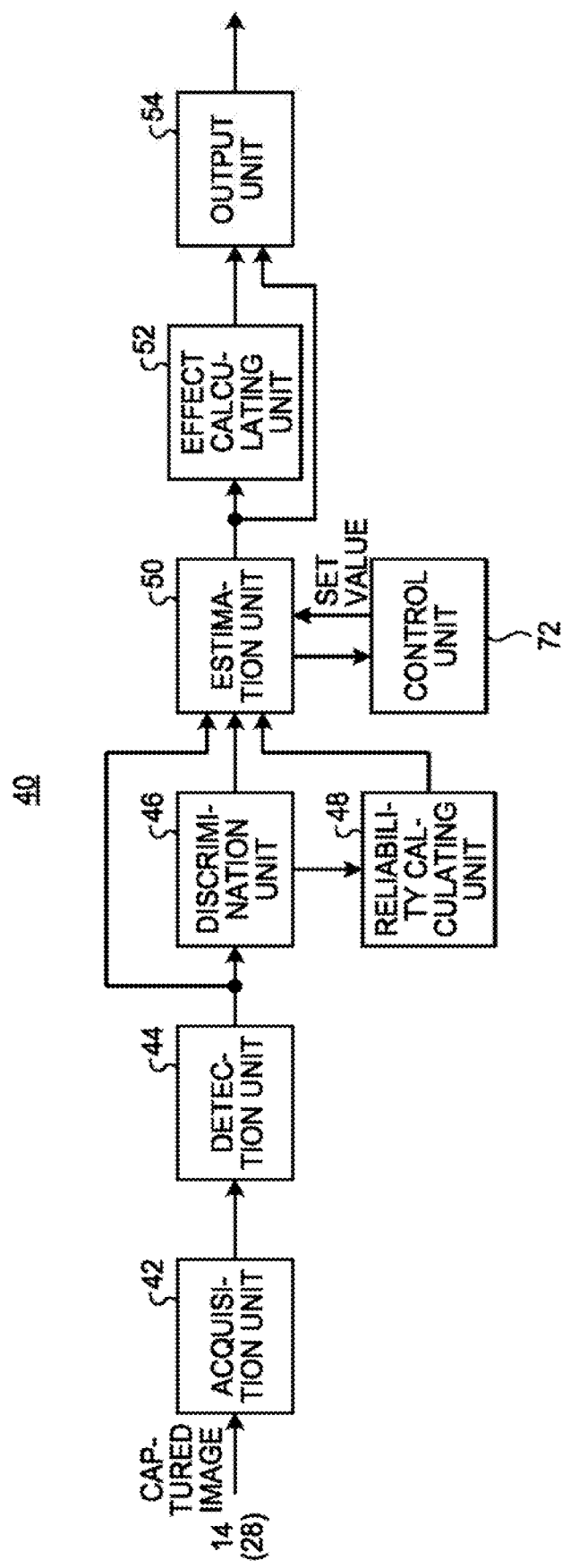
FIG. 7 is a configuration diagram of a target; detection unit according to a variation of the first, embodiment.

FIG. 7 is as diagram illustrating a configuration of the target detection unit 40 according to a variation of the first embodiment. The target detection unit 40 further includes a; control unit 72. The control unit 72 acquires the number of targets for which the reliability is higher than the set value from the estimation unit 50. The control unit 72 discriminates whether the number of targets for which the reliability is higher than the set value is less than or equal to a predetermined number.

When the number of targets for which the reliability is higher than the set value is less than or equal to the predetermined number, the control unit 72 lowers the set value. For example, the control unit 72 calculates a new set value by subtracting a predetermined value from the original set value or by multiplying the original set value by a predetermined ratio. Then, when receiving the new set value, the estimation unit 50 executes estimation processing for the second time. As a result of this, the control unit 72 can avoid that the distribution of the target information representing at least one of states or attributes cannot be accurately calculated since the number of targets for which the reliability is higher than the set value is too small.

As described above, according to the detection system 10 of the first embodiment, the distribution of the target information representing at least one of states or attributes of a plurality of targets present in the first space can be accurately estimated. For example, the detection system 10 accurately calculates the number of targets present in the first space and in a predetermined state or having a predetermined attribute (or in a predetermined state and having a predetermined attribute).

For example, when a target is a person, the display device 12 displays an advertisement and the estimation unit 50 calculates the number of targets looking at the display device 12 as an object, the detection system 10 according to the first embodiment can accurately calculate an advertising effect and other information.

Note that the object that a target looks at is not limited to the display device 12 displaying the advertisement. For example, the object looked at by a target may be a product displayed in a store or other places. In such a case, the detection system 10 can calculate the number of persons interested the displayed product.

Second Embodiment

Figure 8:
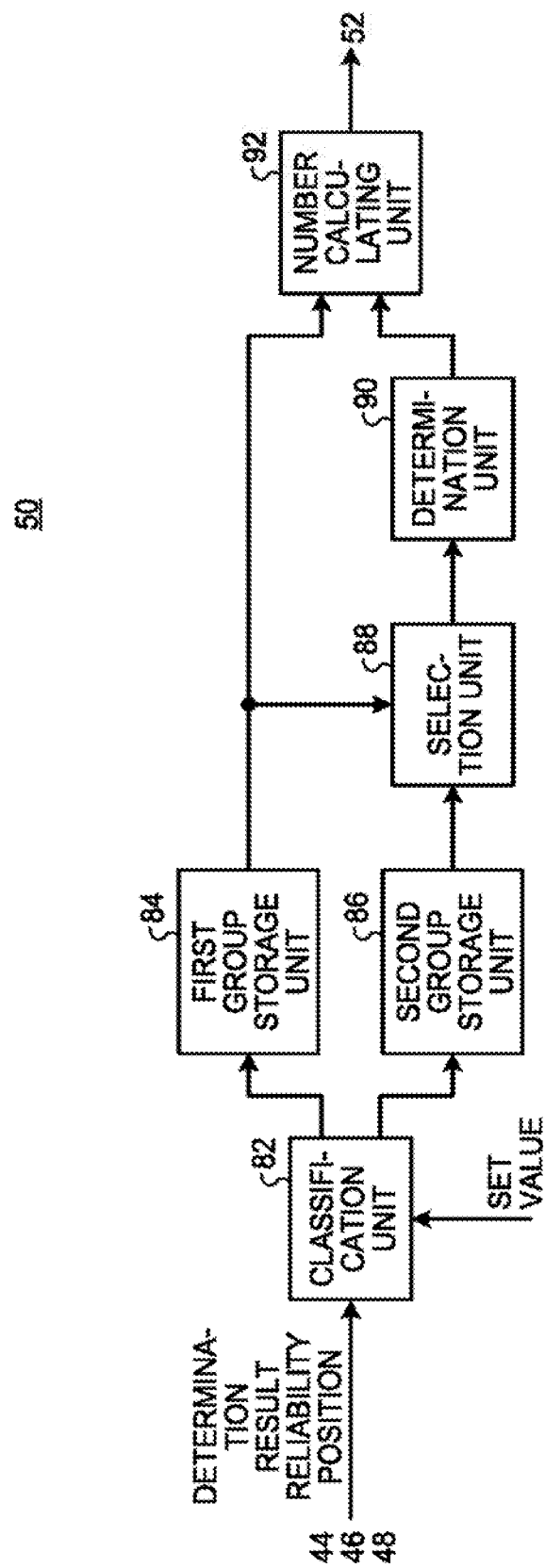
FIG. 8 is a configuration diagram of an estimation unit according to a second embodiment.

FIG. 8 is a diagram illustrating a configuration of an estimation unit 50 according to a second embodiment. The detection system 10 according to the second embodiment has a different configuration for the estimation unit 50.

There is a high probability that the targets close to each other are in the same state or having the same attribute. On the basis of such a premise, the estimation unit 50 according to the second embodiment estimates a state and an attribute of a target for which the reliability is less than or equal to a set value on the basis of a discrimination result of a state of a target for which the reliability is higher than the set value and located in the vicinity.

In the second embodiment, the discrimination unit 46 discriminates whether each of a plurality of targets detected by the detection unit 44 is in a predetermined state or having a predetermined attribute. For example, a target is a person and the predetermined state is a state in which the person is looking at the display device 12 as an object installed at a predetermined position. The discrimination unit 46 then discriminates whether each of the plurality of detected targets is looking at the display device 12.

The estimation unit 50 according to the second embodiment includes a classification unit 82, a first group storage unit 84, a second group storage unit 86, a selection unit 88, a determination unit 90, and a number calculating unit 92.

The classification unit 82 receives a set value having been input in advance. The classification unit 82 classifies each of the plurality of targets detected by the detection unit 44 into a first group for which the reliability is higher than the set value and a second croup for which the reliability is lower than or equal, to the set value.

The first group storage unit 84 stores a discrimination result, reliability and the position of a target classified into the first group. The second group storage unit 86 stores a discrimination result, reliability and the position of a target classified into the second group.

The selection unit 88 selects a predetermined number of targets from the first group, in order from closest to a target belonging to the second group. For example, the selection unit 88 searches information stored in the first group storage unit 84 and the second group storage unit 86 to select a predetermined number of targets.

The determination unit 90 determines whether the target belonging to the ascend group is in a predetermined state or having a predetermined attribute on the basis of a discrimination result of each of a predetermined number of selected targets.

The number calculating unit 92 reads the discrimination results for the respective targets belonging to the first group from the first group storage unit 84. The number calculating unit 92 further acquires the determination results for the respective targets belonging to the second group from the determination unit 90.

Then, on the basis of the discrimination results for the respective targets belonging to the first group and the determination results for the respective targets belonging to the second group, the number calculating unit 92 calculates the number of targets present in a first space and in a predetermined state or having a predetermined attribute. For example, the number calculating unit 92 adds the number of targets belong to the first group and discriminated to be in the predetermined state or having the predetermined attribute and the number of targets belonging to the second group and determined to be in the predetermined state or having the predetermined attribute to calculate the number of targets present in the first, space and in the predetermined state or having the predetermined attribute.

For example, the determination unit 90 determines whether a target belonging to the second group is in the predetermined state or having the predetermined attribute by processing as the following, for example.

The determination unit 90 determines whether the target belonging to the second group is in the predetermined state or having the predetermined attribute by deciding by majority from the discrimination results for the predetermined number of selected targets.

For example, it is assumed that the determination unit 90 has selected three targets (B, C and D) from the first group in order from closest to a certain target (A) belonging to the second group. At this time, it is assumed that states of the three targets (B, C and D) are VB, VC and VD. For example, VB, VC, and VD are given "1" when a target is the predetermined attribute (e.g. a state in which the target is looking at the display device 12) and given "−1" when not in the predetermined attribute. In this case, if VA=VB+VC+VD is true, the determination unit 90 determines that the target (A) belonging to the second group has a predetermined attribute (e.g. a state in which the target, is looking at the display device 12).

For each of the targets belonging to the second group, the determination unit 90 gives a greater weighting to the discrimination result for each of the predetermined number of selected targets as a distance from the target to be determined is closer. Then, the determination unit 90 may determine whether being in the predetermined state or having the predetermined attribute on the basis of a discrimination result for each of the predetermined number of selected targets after the weighting is given.

For example, it: is assumed that, a distance from the target (A) belonging to the second group to the target (B) selected from the first group is LB. Also, it is assumed that a distance from the target (A) to the target (C) selected from the first group is LC. Also, it is assumed that a distance from the target (A) to the target (D) selected from the first group is LD. In this case, if VA=(VB/LB)+(VC/LC)+(VD/LD) is true, the determination unit 90 determines that the target. (A) belonging to the second group has a predetermined attribute (e.g. state in which the target is looking at the display device 12).

Furthermore, for each of the targets belonging to the second group, the determination, unit 90 gives a larger weighting to the discrimination result for each of the predetermined number of selected targets as reliability is higher. Then, the determination unit 90 may determine whether being in the predetermined state or having the predetermined attribute on the basis of a discrimination result for each of the predetermined number of selected targets after the weighting is given.

For example, it is assumed, that, reliability of the discrimination result for the certain target (A) belonging to the second group is αA. Furthermore, if is assumed that reliability of the discrimination results for the three targets (B, C and D; selected from the first group is αB, αC and αD, respectively. In this case, if VA=(αA=VA/1)+(αB×VB/LB)+(αC×VC/LC)+(αD×VD/LD) is true, the determination, unit 90 determines that the target (A) belonging to the second group has the predetermined attribute (e.g. state in which the target is looking at the display device 12).

Figure 9:
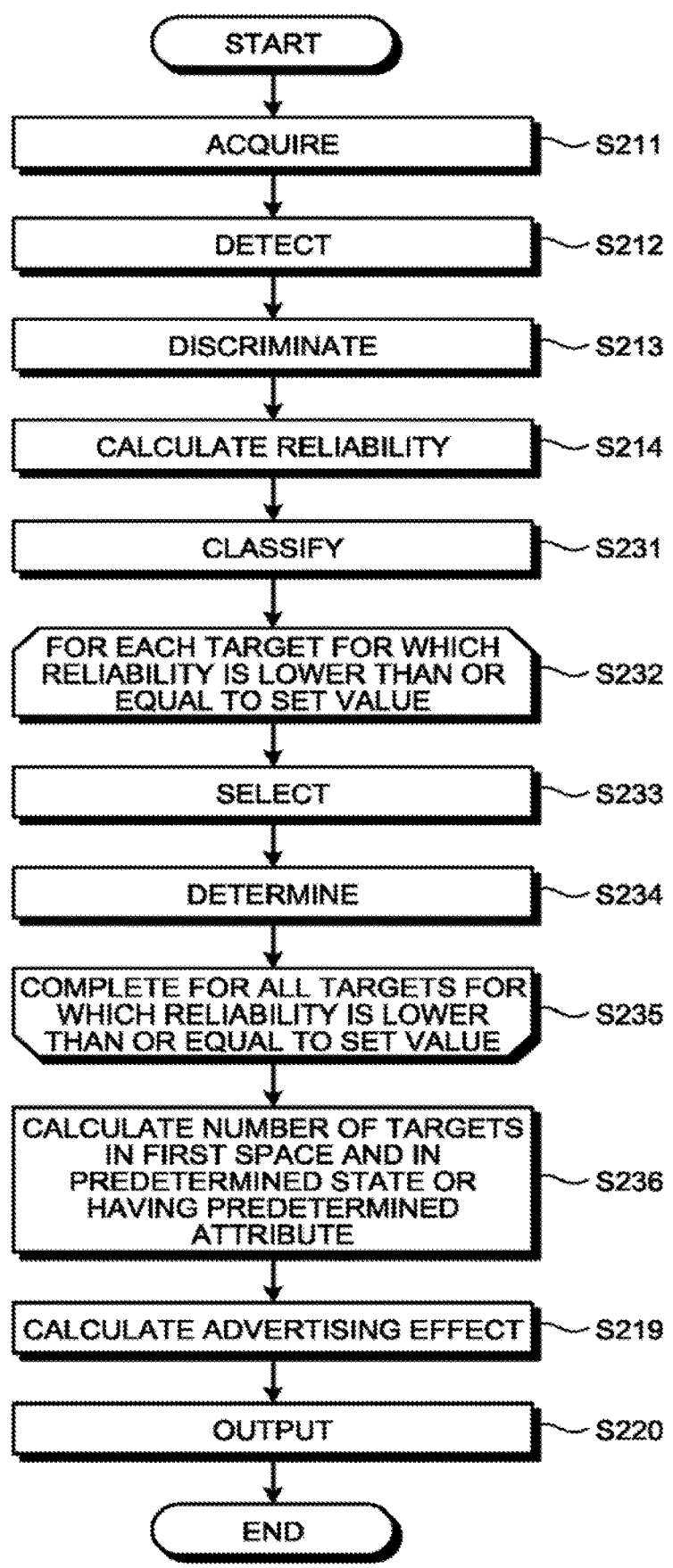
FIG. 9 is a flowchart illustrating processing of a target detection unit according to the second embodiment.

FIG. 9 is a flowchart illustrating processing of the target detection unit 40 according to the second embodiment. Note that the processing from S211 to S214 in FIG. 9 and the processing from S219 to S220 are the same as the processing illustrated in FIG. 5. Differences from FIG. 5 will foe described below.

Subsequent, to S214, the estimation unit 50 classifies each of the plurality of defected targets into a first group for which the reliability is higher than a set value and a second group for which the reliability is lower than or equal to the set value in S231. Subsequently, the estimation unit 50 executes the processing of S233 and S234 for each of the targets belonging to the second group (that is, for each of the targets for which the reliability is less than or equal to the set value) (loop processing between S232 and S235).

The estimation unit 50 selects a predetermined number of targets from the first group in order from closest to a target belonging to the second group is S233. In S234, the estimation unit 50 determines whether being in the predetermined state or having the predetermined attribute on the basis of a discrimination result of each of the predetermined number of selected targets.

For example, the determination unit 90 determines, for the target belonging to the scored group, whether being in the predetermined state or having the predetermined attribute by deciding by majority from the discrimination results for the predetermined number of selected targets. Furthermore, the determination unit 90 may determine whether being in the predetermined state or having the predetermined attribute by considering the weighting of distance or reliability.

When the processing of S233 and S234 is completed for all the targets belonging to the second group, the estimation unit 50 advances the processing to S236. In S236, on the basis of the discrimination results for the respective targets belonging to the first group and the determination results for the respective targets belonging to the second group, the estimation unit 50 calculates the number of targets present in the first space and in the predetermined state or having the predetermined attribute. Subsequently to the step S236, the target detection unit 40 executes the processing of S219 and S220.

Figure 10:
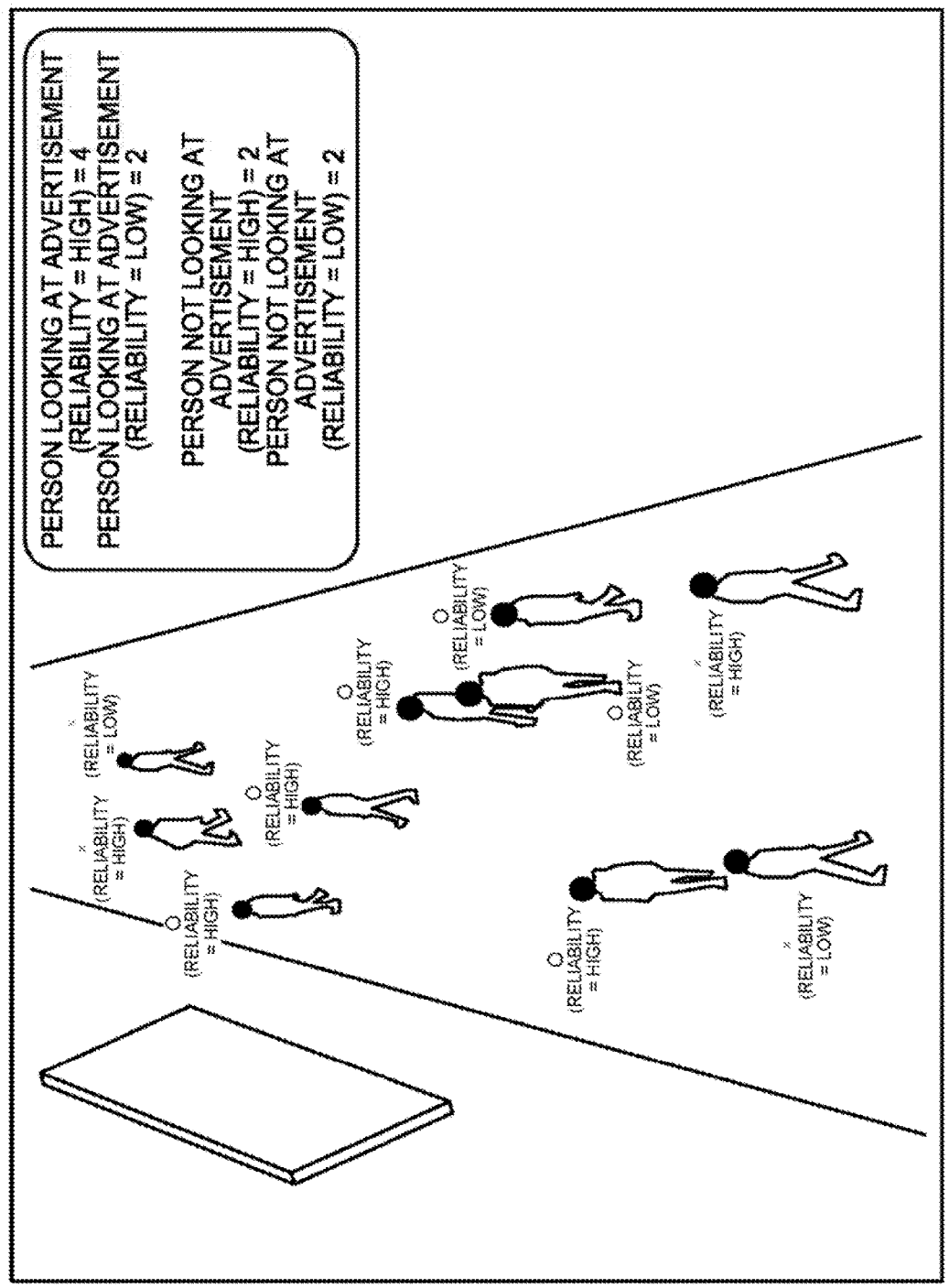
FIG. 10 is a diagram illustrating an exemplary output image according to the second embodiment.

FIG. 10 is a diagram illustrating an exemplary an output image output from the target detection unit 40 according to the second embodiment. The estimation unit 50 according to the second embodiment outputs a discrimination result as to whether a target is in the predetermined state or having the predetermined attribute for each of a plurality of targets present in the first space. Therefore, the output unit 54 according to the second embodiment adds, at positions corresponding to each of a plurality of targets in the output image, a discrimination result of the predetermined state or the predetermined attribute of each of the plurality of targets present in the first space and information representing reliability.

For example, as illustrated in FIG. 10, the output unit 54 adds a circle to a corresponding position in the output image to a target discriminated or determined to be looking at the advertisement. Furthermore, for example, the output unit 54 adds a cross mark to a corresponding position in the output image to the target discriminated or determined to be not looking at the advertisement.

Furthermore, the output unit 54 adds information indicating that reliability is high to a target for which the reliability is higher than the set value, at a corresponding position in the output image. Furthermore, the output unit 54 adds information indicating that reliability is low to a corresponding position in the output image to a target for which the reliability is lower than or equal to the set value.

Furthermore, for example, the output unit 54 may add information indicating the number of targets looking at she advertisement and information indicating the number of targets not looking at the advertisement to the output image for each reliability. For example, the output unit 54 may add, to the output image, the number ox persons for whom reliability is higher than the set value and whom look at the advertisement, the number of persons for whom reliability is higher than the set value and who do not look at the advertisement, the number of persons for whom reliability is lower than or equal to the set value and who look at the advertisement, and the number of persons for whom reliability is lower than or equal to the set value and who do not look at the advertisement.

Also, the effect calculating unit 52 may calculate the same advertising effect as in the first embodiment. Furthermore, in the second embodiment, for each of the plurality of targets present in the first space, a discrimination result as to whether being in the predetermined state or having the predetermined attribute is identified. Therefore, the effect calculating unit 52 may correct the advertising effect according to the position of a target. For example, the effect calculating unit 52 may raise an advertising effect as a target is closer to the display device 12 displaying the advertisement.

Furthermore, the effect calculating unit 52 may add, to the advertisement, the position of a target discriminated or determined to be looking at to the advertisement. This allows the effect calculating unit 52 to calculate a spatial advertising effect such as from which position the advertisement is looked at.

Third Embodiment

Figure 11:
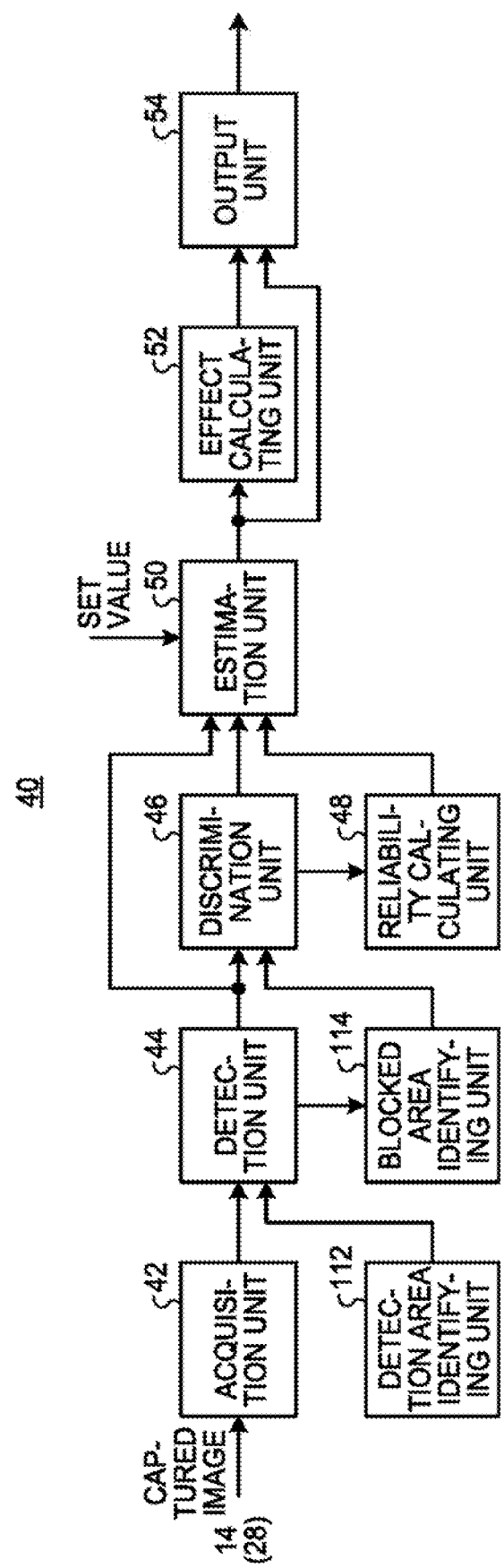
FIG. 11 is a configuration diagram of a target detection unit according to a third embodiment.
Figure 12:
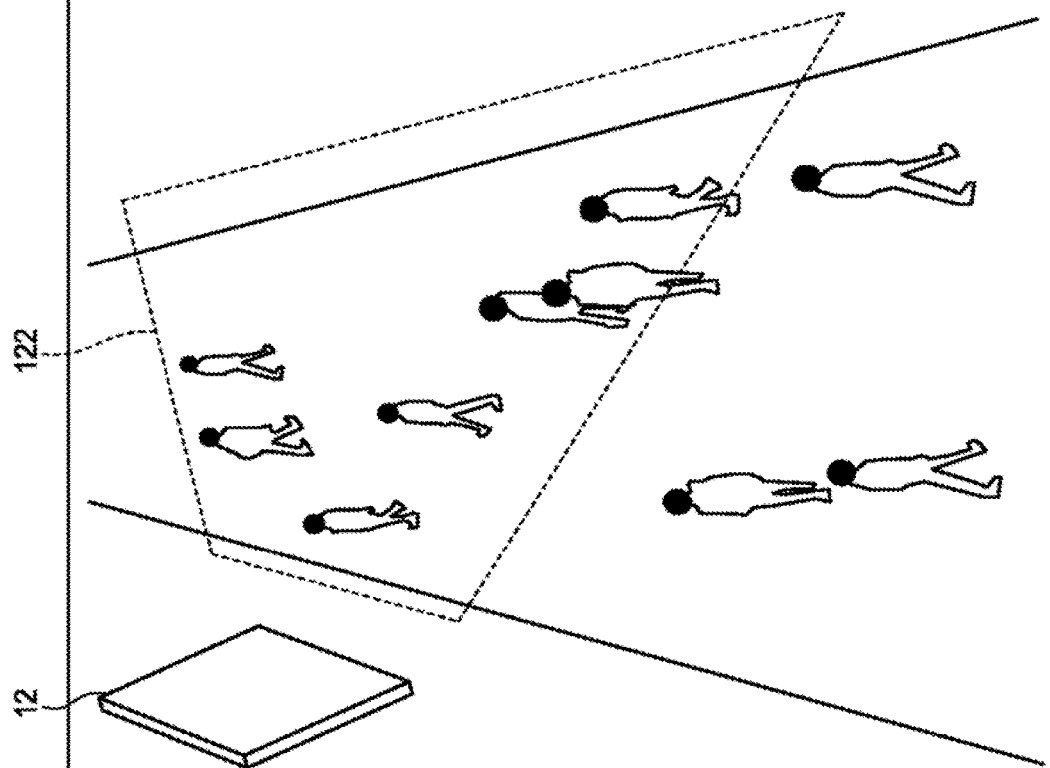
FIG. 12 is a diagram illustrating a first example of an output image according to the third embodiment.
Figure 13:
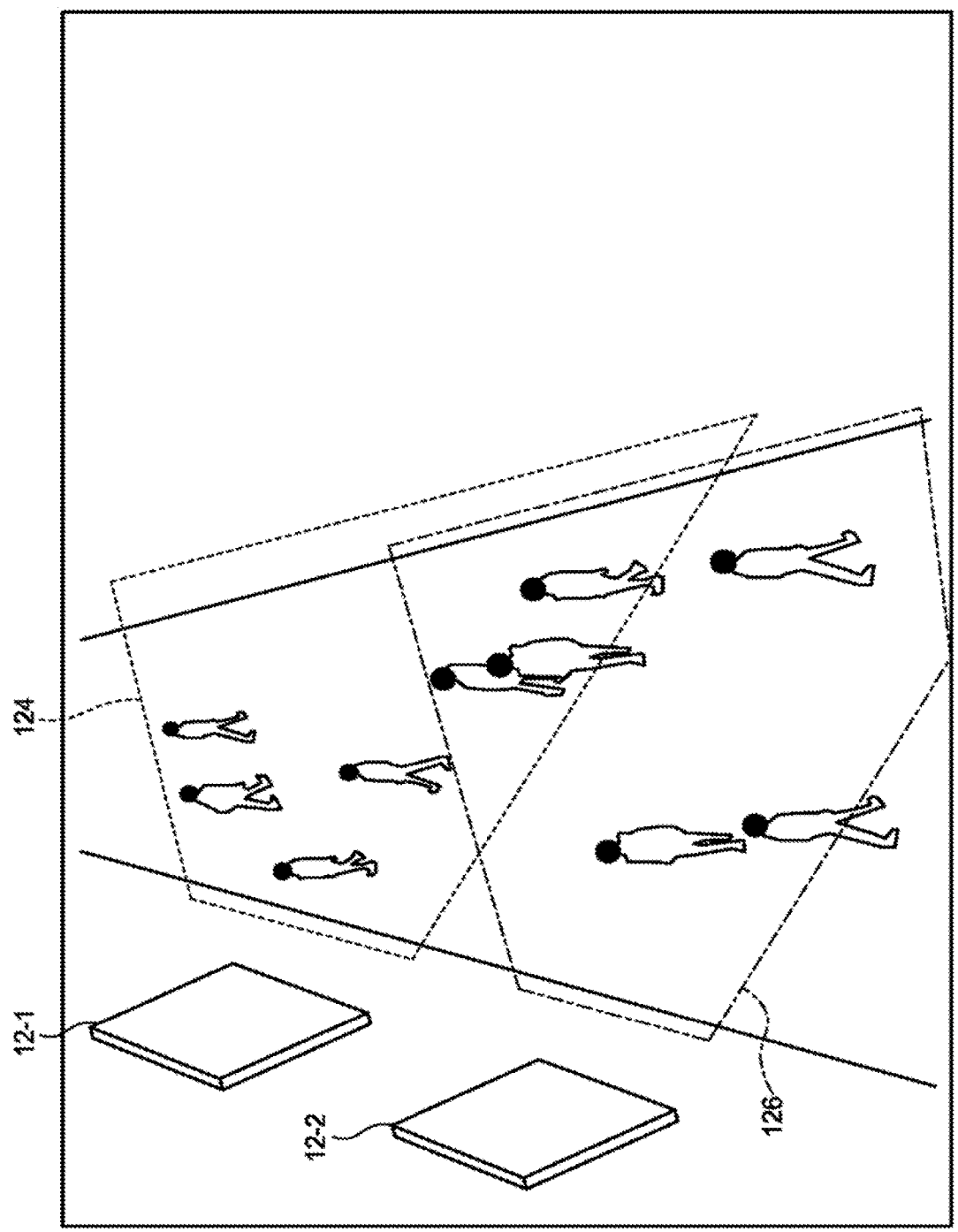
FIG. 13 is a diagram illustrating a second example an output image according to the third embodiment.

FIG. 11 is a diagram illustrating a configuration of a target detection unit 40 according to a third embodiment. FIG. 12 is a diagram illustrating a first example of an output image output from the target detection unit 40 according to the third embodiment. FIG. 13 is a diagram illustrating a second example of an output image output from the target detection unit 40 according to the third embodiment.

The target detection unit 40 according to the third embodiment further includes a detection area identifying unit 112 and a blocked area identifying unit 114. The detection area identifying unit 112 identifies as partial image corresponding to a first space in a captured image.

For example, there are cases where a space is which the display device 12 can be looked at is a part of the entire space included in the captured image. In such a case, even if all the targets included in the captured image are detected, a detected target may net be able to actually see the display device 12.

Therefore, the detection area identifying unit 112 sets in advance an area corresponding to the first space, in which a target is to be detected in a captured image. For example, as illustrated in FIG. 12, the detection area identifying unit 112 identifies a part of the area of a captured image as a detection area 122 corresponding to a space in which the display device 12 can be looked in the captured image. The detection area identifying unit 112 may for example acquire information manually set by an operator.

The detection unit 44 then detects a target from the identified defection area 122. This allows the detection unit 44 to accurately detect the plurality of targets present in the first space.

In addition, there are cases where a space included, in a captured image includes a space in which a first display device 12-1 can be looked at and a space in which a second display device 12-2 can be looked at. In this case, it is possible to detect a target looking at the first display device 12-1 and a target looking at the second display device 12-2 from, one imaging device 14.

Therefore, in such a case, the detection area identifying unit 112 sets in advance an area corresponding to the space in which the first display device 12-1 can be looked at in the captured image and an area corresponding to the space in which the second display device 12-2 can be locked at in the captured image. For example, as illustrated in FIG. 13, the detection area identifying unit 112 sets a first detection area 124 corresponding to the space in which the first display device 12-1 can be looked at and a second detection, area 126 corresponding to the space in which the second display device 12-2 can be looked at. The detection unit 44 then independently detects a target for each of the first detection area 124 and the second detection area 126. This allows the detection unit 44 to detect, a plurality of targets present in a plurality of first spaces from one captured image. Note that the detection area identifying unit 112 may identify an area for each of more display devices 12 without limited to the two display devices 12.

The blocked area identifying unit 114 detects a blocked area in which the object cannot be looked at on the basis of a detection result of each of the plurality of targets present in the first space For example, when the display device 12 is installed at a low place, a person behind cannot see the display device 12 if another person is standing between the display device 12 and the person behind. Therefore, for example, the blocked area identifying unit 114 detects an opposite side from the display device 12 as an object with respect to the target as a blocked area.

The discrimination unit 46 acquires information on the blocked area from the blocked area identifying unit 114.

Then, the discrimination unit 46 discriminates a state of each of the plurality of targets according to whether the target is included in the blocked area. For example, when a target is included in the blocked area, the discrimination unit 46 determines that the target is not looking at the display device 12. As a result of this, the discrimination unit 46 can accurately discriminate a state of the target.

The first, to third embodiments have been described above. A program executed by the information processing device 20 of these embodiments is provided by being recorded in a computer readable recording medium such as a CD-ROM, a flexible disk (FD), a CD-R or a DVD in an installable file format or an executable file format. Alternatively, the program executed on the information processing device 20 of the present embodiments may be provided by being stored in a computer connected to a network such as the Internet and allowing download therefrom via the network. Alternatively, the program executed on the information processing device 20 of the present, embodiments may be provided or distributed via a network such as the Internet. In addition, the program of the present embodiments may be provided by being incorporated in a ROM or the like in advance.

The program for causing the information processing device 20 to function as the target detection, unit 40 includes an acquisition module, a detection module, a discrimination module, a reliability calculating module, an estimation module, an effect calculating module, and an output module. In the information processing device 20, readout and execution of the program from, the storage circuit 28 by the processing circuit 30 (e.g. one or more processors) allow the respective modules to be loaded on a main storage device (e.g. memory such as a RAM). This also allows the processing circuit 30 (e.g. one or more processors) to function as the acquisition unit 42, the detection unit 44, the discrimination unit 46, the reliability calculating unit 48, the estimation unit 50, the effect calculating unit 52, and the output unit 54.

While certain embodiments have been described, these embodiments have been presented by way of example only, and are not intended to limit the scope of the inventions. Indeed, the novel, embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device comprising:
a memory; and
processing circuitry configured to:
acquire a captured image;
detect a plurality of targets included in the captured image;
calculate target information representing at least one of a state or an attribute and reliability of the target information for each of the plurality of detected targets on the basis of the captured image; and
estimate a distribution of the target information of the plurality of targets on the basis of a distribution of the target information of targets for which the reliability is higher than a set value, wherein
the processing circuitry is further configured to lower the set value when the number of targets for which the reliability is higher than the set value is equal to or less than a predetermined number.

2. The device according to claim 1, wherein the processing circuitry is further configured to:
discriminate whether each of the plurality of detected targets is in a predetermined state or has a predetermined attribute, and
estimate the distribution of targets in the predetermined state or having the predetermined attribute on the basis of targets for which reliability is higher than the set value and which are discriminated to be in the predetermined state or have the predetermined attribute.

3. The device according to claim 1, wherein the processing circuitry is further configured to:
discriminate whether each of the plurality of detected targets is in a predetermined state and has a predetermined attribute, and
calculate a number of targets in the predetermined state and having the predetermined attribute on the basis of targets for which reliability is higher than the set value and which are discriminated to be in the predetermined state and have the predetermined attribute.

4. The device according to claim 2, wherein the processing circuitry is configured to calculate the number of targets in the predetermined state or having the predetermined attribute on the basis of a ratio of the number of the targets for which the reliability is higher than the set value and which are discriminated to be in the predetermined state or have the predetermined attribute to a number of targets for which the reliability is higher than the set value.

5. The device according to claim 2, wherein the processing circuitry is further configured to:
classify each of the plurality of detected targets into a first group for which the reliability is higher than the set value and a second group for which reliability is lower than or equal to the set value;
select a predetermined number of targets from among the first group in order from closest to each target belonging to the second group;
determine whether the target belonging to the second group is in the predetermined state or has the predetermined attribute on the basis of discrimination results of the predetermined number of selected targets; and
calculate the number of targets in the predetermined state or having the predetermined attribute on the basis of a discrimination result for each of the targets belonging to the first group and a determination result for each of the targets belonging to the second group.

6. The device according to claim 2, wherein
each of the plurality of targets is a person,
the predetermined state is a state in which a person is looking at an object installed at a predetermined position, and
the processing circuitry is configured to discriminate whether each of the plurality of detected targets is looking at the object.

7. The device according to claim 6, wherein
the object is a display device that displays an advertisement, and
the processing circuitry is configured to calculate the number of targets looking at the display device.

8. The device according to claim 6, wherein the predetermined state is a state in which the target is oriented toward the object.

9. The device according to claim 6, wherein the predetermined state is a state in which the target is moving at a predetermined speed or less.

10. The device according to claim 1, wherein the processing circuitry is further configured to:

identify partial image corresponding to a first space in the captured image, and detect each of the plurality of targets included in the partial image.

11. The device according to claim 8, wherein the processing circuitry is further configured to:

detect a blocked area where the object cannot be seen on the basis of a detection result of each of the plurality of targets, and discriminate a state of each of the plurality of targets according to whether the target is included in the blocked area.

12. An information processing method executed by an information processing device, the method comprising:

acquiring a captured image by the information processing device;

detecting a plurality of targets included in the captured image by the information processing device;

calculating, by the information processing device, target information representing at least one of a state or an attribute and reliability of the target information for each of the plurality of detected targets on the basis of the captured image; and estimating, by the information processing device, a distribution of the target information of the plurality of targets on the basis of a distribution of the target information of targets for which the reliability is higher than a set value, wherein the set value is lowered when the number of targets for which the reliability is higher than the set value is equal to or less than a predetermined number.

13. The method according to claim 12, wherein the detecting includes discriminating whether each of the plurality of detected targets is in a predetermined state or has a predetermined attribute, and the estimating includes estimating the distribution of targets in the predetermined state or having the predetermined attribute on the basis of targets for which reliability is higher than the set value and which are discriminated to be in the predetermined state or have the predetermined attribute.

14. The method according to claim 12, wherein the detecting includes discriminating whether each of the plurality of detected targets is in a predetermined state and has a predetermined attribute, and the estimating includes calculating a number of targets in the predetermined state and having the predetermined attribute on the basis of targets for which reliability is higher than the set value and which are discriminated to be in the predetermined state and have the predetermined attribute.

15. The method according to claim 13, wherein the estimating includes calculating the number of targets in the predetermined state or having the predetermined attribute on the basis of a ratio of the number of the targets for which the reliability is higher than the set value and which are discriminated to be in the predetermined state or have the predetermined attribute to a number of targets for which the reliability is higher than the set value.

16. The method according to claim 13, wherein the estimating includes:

classifying, each of the plurality of detected targets into a first group for which the reliability is higher than the set value and a second group for which reliability is lower than or equal to the set value;

selecting, a predetermined number of targets from among the first group in order from closest to each target belonging to the second group;

determining, whether the target belonging to the second group is in the predetermined state or has the predetermined attribute on the basis of discrimination results of the predetermined number of selected targets; and calculating, the number of targets in the predetermined state or having the predetermined attribute on the basis of a discrimination result for each of the targets belonging to the first group and a determination result for each of the targets belonging to the second group.

17. A computer program product comprising:

a non-transitory computer readable storage medium including programmed instructions, the instructions causing a computer to execute the information processing method according to claim 12.

18. An information processing device comprising:

a memory; and processing circuitry configured to:

acquire a captured image;

detect a plurality of targets included in the captured image;

calculate target information of a plurality of types, each of the target information representing at least one of a state or an attribute, and calculate each reliability of the target information of the plurality of types for each of the plurality of detected targets on the basis of the captured image; and estimate a distribution of the target information of the plurality of types for the plurality of targets on the basis of a distribution of the target information of the plurality of types for the targets for which the reliability is higher than the set value.

* * * * *